May 6, 1941.　　O. L. STARR　　2,240,870
LUBRICATION SYSTEM
Filed March 7, 1938　　2 Sheets-Sheet 1
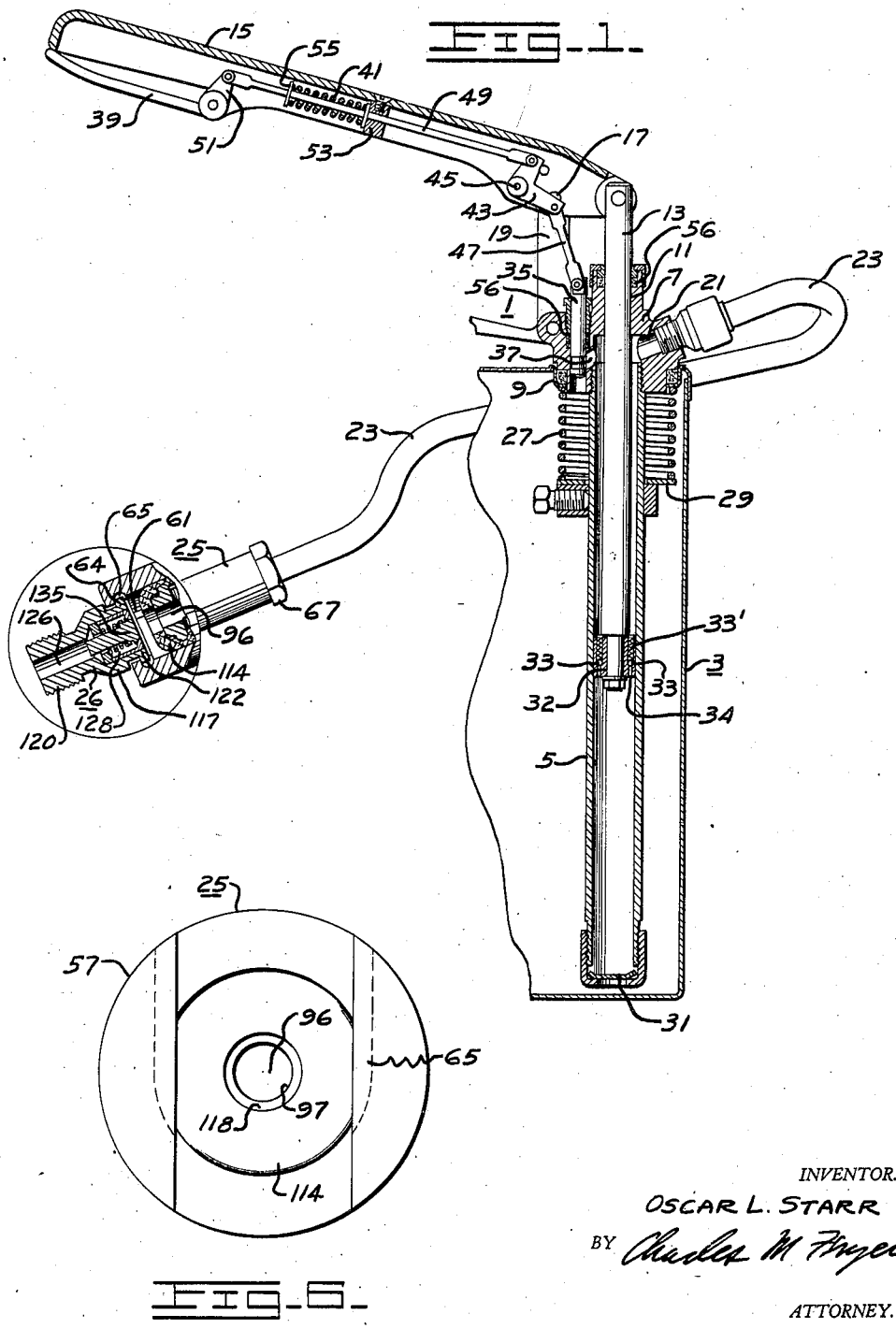
INVENTOR.
OSCAR L. STARR
BY Charles M. Fryer
ATTORNEY.

May 6, 1941.  O. L. STARR  2,240,870
LUBRICATION SYSTEM
Filed March 7, 1938  2 Sheets-Sheet 2
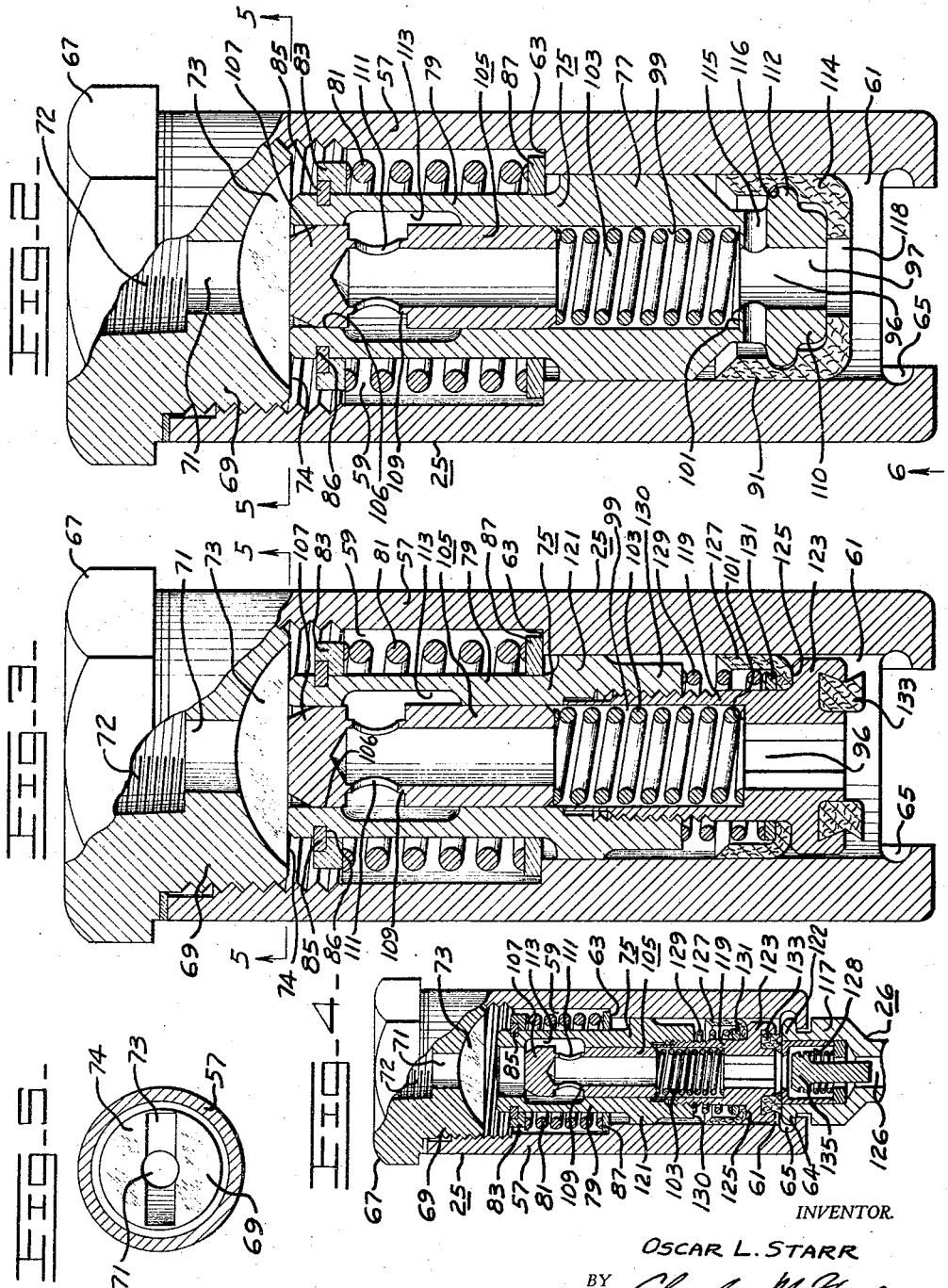
INVENTOR.
OSCAR L. STARR
BY Charles M. Fryer
ATTORNEY.

Patented May 6, 1941

2,240,870

UNITED STATES PATENT OFFICE 2,240,870

LUBRICATION SYSTEM

Oscar L. Starr, Mission San Jose, Calif., assignor to Caterpillar Tractor Co., San Leandro, Calif., a corporation of California Application March 7, 1938, Serial No. 194,371

13 Claims. (Cl. 284—19)

My invention relates to a lubricating system, more particularly to an improved coupling for use in connection with a lubrication pump or the like.

Couplings of the prior art of the type concerning which my invention relates usually are so constructed as to terminate at their outlet ends in a sealing gasket or the like which during the operation of connecting the coupling to a fitting is forced into compression against the face of the fitting to provide a seal around the opening to the fitting, to prevent escape of lubricant between the fitting and the coupling during the lubrication period. This sealing gasket is subject to severe abrasion in the act of applying the coupling to a fitting, by reason of the fact that it must be slid into place, and as is usually the case, a substantial amount of abrasive material, such as dust and grit, will be found to be present on the face of the fitting. Such severe abrasion necessarily destroys the sealing ability of the sealing gasket, ultimately wearing it down to a point where the coupling has to be replaced or repaired.

It has furthermore been common experience in the utilization of grease guns or grease pumps for lubrication purposes, to find that upon disconnecting the coupling element from the fitting to which it has been connected, a substantial amount of grease or lubricant will overhang the face of the fitting and an appreciable amount will also be forced out of the coupling. This is undesirable from the viewpoint that dirt and grit readily adhere thereto which may ultimately, upon subsequent greasing operations, be forced into the bearing or between the parts which it is desired to lubricate.

My invention has for its general purpose to overcome the undesirable characteristics associated with the above mentioned prior art construction and accordingly, it is an object of my invention to provide an improved lubrication system for pressure lubrication.

A further object of my invention is to provide an improved lubrication system which will assure absence of dripping or squirting of lubricant at the moment of disconnecting the lubricating coupling from its connection to a fitting.

Another object of my invention is to provide a lubricating coupling which will establish an improved sealing effect with a fitting to which the coupling may be connected.

A further object of my invention is to provide a coupling for positive interlocking connection with a fitting which shall be more readily applicable and removable from the fitting.

An additional object of my invention is to provide a lubricating coupling which shall effect a sealing engagement with a fitting after the coupling has been securely attached to the fitting.

A still further object of my invention is to provide an improved lubricating coupling wherein wear on the sealing means is minimized.

A further object of my invention is to provide an improved lubricating coupling wherein the sealing means will not be subject to the abrasive action of grit or similar material on the face of the fitting.

Additional objects of my invention will be disclosed in the following description of the same taken in connection with the accompanying drawings wherein:

Fig. 1 is a view depicting a lubrication system of the type to which my invention pertains, including pumping means connected by a hose to a coupling of my improved construction, a portion of which is broken away and magnified to show its relationship to a fitting when connected thereto and before operation of the pump occurs.

Fig. 2 is an enlarged view in section of the coupling means of Fig. 1.

Figure 3 is a view in section of a modification of the construction of Fig. 2.

Fig. 4 is a view in section of the coupling of Fig. 3 showing its connection to a fitting, and the cooperating relationship of its elements during lubrication.

Fig. 5 is a view along the line 5—5 of Figs. 2 and 3.

Fig. 6 is a view looking at the outlet or fitting attaching end of the coupling of Fig. 2, in the direction of arrow 6 in Fig. 2.

The above figures are substantially to scale. In the different embodiments of the invention illustrated, the same reference numerals designate similar elements.

In general, I have improved upon the constructions of the prior art as known by me, in providing a coupling including sealing means which is normally in a restricted position with respect to the fitting engaging end of the coupling and is capable of being urged into sealing engagement with the fitting after a connection has been effected between the coupling and the fitting. The construction of the coupling is such that the sealing operation occurs before passage of lubricant through the coupling and there exists no likelihood of the lubricant ever being pumped through the coupling before sealing takes place.

Referring to Fig. 1, I have disclosed a pump 1 adapted for mounting within a can or reservoir 3 for holding grease or other suitable lubricant. The pump comprises a cylinder 5 extending substantially to the bottom of the can, and threaded at its upper end to a casting 7 supported in a depressed portion 9 of the top wall of the can. The casting is provided with a bore 11 in alignment with the axis of the cylinder 5 to receive a pump piston or plunger 13 and act as a guide therefor. A suitable handle 15 pivotally connected at one end to the upper end of the piston 13 is adapted to be fulcrumed at the extremity 17 of an extension 19 which is supported by the before-mentioned casting 7. The piston 13 is thereby adapted to be reciprocated within the cylinder 5 by movement of the handle 15.

Another passage 21 angularly disposed through the casting 7 is adapted to connect with the interior chamber of the pump and is screw-threaded for connection with a hose 23, to the other end of which hose is attached my improved coupling 25, the coupling being shown connected to a fitting 26. The pump is retained in its position within the can by means of a coil spring 27 surrounding the cylinder 5 and supported in compression between a washer 29 mounted about the cylinder, and the depressed portion 9 in the roof of the can. This manner of mounting allows the pump 1 to be rotated and thus permit the handle 15 to be swung out of the way of the cover of the can to provide access thereto for filling purposes.

The pump is of the double acting type and accordingly is adapted to pump on both the down stroke and the up stroke of the piston. To accomplish this result, the bottom of the cylinder 5 is provided with a floating valve member 31 which is adapted to lift on the up stroke of the pump plunger 13 and permit of the introduction of lubricant and then close the inlet end of the pump on the downward stroke of the plunger; and the plunger is made large in diameter with reference to the diameter of the cylinder to constitute a plunger of the displacement type. Also, the plunger has secured thereto a piston member 32 provided therein with a plurality of ball check valves 33 pressed by springs 33' normally to close ports 34. Thus on the down stroke of the plunger with reference to Fig. 1, lubricant will pass upwardly through ports 34 and because of the large diameter of the plunger 13 will be displaced through passage 21. On the up stroke of the plunger, lubricant will be lifted by member 32 through passage 21; the valves 33 being seated on this stroke. A pump of this character will operate to force lubricant through the hose connection on both the down stroke and up stroke of the plunger and thereby maintain a continuous pressure in the hose line.

In connection with this pump, I have provided a relief valve which will automatically operate upon release of the handle 15 at the termination of a pumping operation to reduce the pressure in the pump to the pressure then existing within the can which is usually atmospheric pressure. The relief valve constitutes a plunger 35 mounted for axial movement in a channel provided in the before-mentioned casting 7, and during axial movement is adapted to open and close a port 37 connecting the upper end of the pump chamber with the inside of the can. The operation of the relief valve plunger 35 is controlled by a grip member 39 pivotally connected at one end of the pump handle 15 and adapted to operate against the action of a spring 41, to push the valve plunger 35 down and close the relief port 37.

The connection between the grip member 39 and the relief valve plunger 35 comprises a bell-crank lever 43 pivoted to the handle at a point 45 near the fulcrum 17, one end of the bell-crank 43 being linked to the upper end of the plunger 35 by a suitable link 47. The other end of the bell-crank is connected by a rod 49 and link 51 to the grip member 39. The grip member 39 is normally biased away from the handle 15, which position determines the open position of the relief valve, by means of the coil spring 41 surrounding the rod and maintained under partial compression between a stop element 53 affixed to the handle and a shoulder 55 on the rod 49, thus causing the spring 41 to bear against the rod in a direction to urge the grip member 39 to its normally open position.

Suitable gaskets or seals are provided as may be necessary to assure oil-tight seals between the casting 7 and the various parts of the pump 1 which are mounted in the casting element and are relatively movable with respect thereto. Such seals are indicated by reference numeral 56.

In the operation of the pump 1, the grip element 39 is so located with respect to the handle 15 as to be conveniently grasped by an operator and presesd toward the handle 15 to determine the closed position of the relief valve 35 in preparation for operation of the pump. It is held in this position as long as grease or lubricant is being pumped through the coupling 25. Upon completion of the pumping operation, the grip element 39 is naturally released and due to the biasing action of the spring 41, the relief valve will open and permit the oil or lubricant which is under pressure in the coupling 25 and hose 23 to shoot back into the can 3 until the pressure existing in the coupling and the hose is reduced to atmospheric pressure or whatever other pressure may exist in the can at the time. All of this takes place prior to removing the coupling 25 from its connection to the fitting 26. The pump, as illustrated, is shown with the grip element 39 in position against the handle 15, which position determines the closed condition of the relief valve.

The improved coupling 25 illustrated in section in Fig. 2 comprises a body element 57 of cylindrical shape having a passage therethrough, the inner part 59 of the passage, namely, that portion at the inlet end of the coupling, being of greater diameter than the outer part 61 to provide a shoulder 63 at a point approximately half way between the ends of the body element. The outlet end of the body element is formed for engagement with a fitting; and for that type of fitting which is provided with a circumferential flange 64 for attachment purposes, the body element of the coupling will have an internal complementary groove or slot 65, with a portion of the body removed to permit of a sliding connection of the end of the coupling over the fitting (Figs. 1, 2 and 6).

The inlet end of the body 57 is capped with a nut 67 having a shank 69 in threaded engagement with the body, and an axial passage 71 connecting with a diametrically disposed slot 73 in the lower surface 74 of the shank portion 69 to provide a passage for the introduction of the lubricant into the coupling 25. A portion of the passage which lies within the nut is threaded at 72 for connection to a grease gun or grease gun hose connection.

Slidably mounted within the body member 57 is a sealing means which is normally maintained in retracted position against the lower surface of the shank 69 in spaced relationship with the outlet end of the coupling in a manner to be described. The sealing means comprises element 75 having an intermediate portion 77 in close fitting slidable engagement with the internal wall of the body element 57, and having an upper portion 79 of reduced outside diameter to provide with the enlarged internal diameter part 59 of the body member a space or chamber for a coil spring 81 which serves to normally maintain the sealing means in its retracted position. This function of the spring 81 is realized by assembling the spring under partial compression to exercise an upward thrust against a retainer 83 which is held in fixed relationship to the sealing means by means of a split washer 85 fitting within a circumferential groove 86 formed in the upper end of the sealing means. The lower end of the spring 81 abuts against a washer 87 resting upon the shoulder 63 formed on the inner surface of the body member 57.

The sealing means has a longitudinal lubricating passageway 96 therethrough, a portion 97 of the passageway being of less diameter than the portion 99 through the remainder of the sealing means element 75. By reason of the difference in diameters between the two portions of this passageway, a shoulder 101 is formed which provides an abutment for a spring 103, setting within the portion 99 of the passage of larger diameter and comprising an element of a combined valve and pressure reducing means housed within the sealing means element 75.

This combined valve and pressure reducing means comprises a member 105 slidably mounted within the enlarged diameter portion 99 of the passage 96 through the sealing means, and adapted to abut against the lower surface 74 of the shank 69 by reason of pressure exerted by the spring 103 at its other end. This member 105 is hollow, and terminates in a solid piston end portion 107 having a close fitting sliding engagement with the inner wall of the sealing means element 75 at 106 and having its abutting end beveled. A section 109 of its wall is thinned down and provided with a pair of diametrically disposed openings 111 connecting the inside hollow portion of the valve member 105 with a circumferential groove 113 of substantial width formed in the inner wall of the upper portion 79 of the sealing means element 75.

Reciprocal movement of the member 105 is permitted by the spring 103. In the normal position of this member 105, that is, before lubrication pressures are developed in the coupling, the piston end portion 107 seals the lubrication passage 96 through the sealing means element 75; but upon sufficient pressure being applied to the piston end portion 107, as when lubricant is being pumped to the coupling, the member 105 will be forced against the spring 103 for a distance sufficient to enable withdrawal of the piston end portion 107 from its sliding engagement with the inner wall portion of the sealing means element 75 to thereby open the passage 96 to the entrance of lubricant. On removing such pressure, the member 105 will be restored by the spring to its original normal position to again seal the passage 96 with the piston end portion 107. In this respect the member 105 functions as a valve with the piston end portion 107 as the valve head.

In the normal position of the member 105, the lubrication passage 96 through the sealing means element 75 has a certain volume on the outlet side of the valve formed by the piston end 107. In the open position of the valve, the volume of this portion of the lubrication passage 96 is reduced by the amount displaced by the piston end portion 107. Consequently, with respect to this reduced volume, it can be said that the element 105 in being subsequently restored to its normal position, will enlarge the volume of the lubrication passage on the outlet side of the valve an amount equal to the piston end portion 107. Thus, any pressure existing in that part of the coupling at the time such enlargement of volume occurs, will be lowered in accordance with such increase in volume. In this respect, the member 105 functions as a pressure reducing element. The significance of this pressure reducing function will be pointed out in explaining the operation of the coupling.

At the outlet end of the sealing means element 75, a portion 110 thereof is of restricted diameter to provide a space with the inner wall of the large diameter part 61 of the body member 57, and has integrally formed thereon a circumferential rib 112. A cup-shape sealing gasket 114 of leather or other satisfactory sealing material is adapted to fit over the restricted end portion 110 of the sealing means element 75 and occupy the space provided between it and the inner wall of the body portion 61. The gasket 114 is preformed with an internal circumferential groove 116 to receive the circumferential rib 112 provided on the restricted end portion 110 of the sealing means element 75 to retain the sealing gasket 114 and has an opening 118 in the bottom in alignment with the axis of the coupling.

Suitable passages 115 are provided in the sealing gasket retaining portion of the sealing means element 75 connecting that portion 97 of the lubricating passage therethrough with the space occupied by the cup-shaped sealing gasket 114 along the wall of the body element 57, to cause lubricant pressure to seal gasket 114 against the inside wall of body portion 61 for a reason to be subsequently explained.

The coil springs 81 and 103 are so calibrated that the larger spring 81, which serves to maintain the sealing means in retracted position, will permit the sealing means to be moved into engagement with a fitting 26 at a pressure per square inch materially lower than the pressure necessary to open the valve 105 against the action of the smaller spring 103. When assembled, both springs are loaded somewhat to bias, respectively, the valve member 105 and sealing means element 75 in abutment against the lower surface 74 of the shank 69 until the lubrication pressure developed in the coupling reaches the proper values necessary to dislodge them.

Thus, it is seen that by the described arrangement, the sealing means 75 is normally out of engagement with the fitting when the coupling is first attached thereto. Upon application of lubricant pressure, the sealing means first engages the fitting to effect a seal, and it is only after such seal is effected that valve 105 will open to pass lubricant.

The fitting 26 of the type illustrated in Fig. 1 is one of the prior art to which the coupling of Fig. 1 is adapted for connection, and comprises a body 117 having one end 120 threaded for engagement at the end of a bearing or the like to be lubricated. The other end 122 has the external peripheral flange 64 to fit into the groove 65 of the coupling. The fitting has a lubricating passage 126 therethrough connecting with a chamber 128 at its coupling connecting end for housing a normally closed spring-biased valve 135.

In servicing a machine or the like upon which the particular fitting 26 is attached, the coupling 25 is connected to the fitting 26 and pressure is built up by the pump against the lubricant which is forced into the coupling 25. When the pressure of this lubricant reaches the value per square inch at which the large spring 81 will give, the sealing means including the member 75 and sealing gasket 114 will be urged into engagement against the face of the fitting 26 and provide a wall of sealing material around the opening in the fitting. Due to the initial loading of the valve spring 103, the valve member 105 will remain in abutment against the lower surface of the shank 69. As the pressure of the lubricant increases, and finally reaches the value at which the valve spring 103 gives, the valve 105 will open and permit lubricant to by-pass the valve head 107 and enter through the side openings 111 into the lubricating channel 96 and be forced against the fitting 26. The beveled edge of the valve head 107 permits opening of the valve in a shorter distance of travel than would be the case were the head not beveled.

With respect to the fittings for which the coupling is designed, the pressure required to open the valve 105 of the coupling should be slightly under that value of pressure necessary to unseat the spring biased valve 135 of the fitting. Thus a slight additional increase in the pressure will cause the fitting valve 135 to open and permit the lubricant to be forced through the fitting under pressure to the bearing or part to be lubricated. After suitable lubrication has been realized, the pump handle 15 is released thereby automatically opening the relief valve 35 to the pump tank 3, thus lowering the pressure at that end of the system to that in the tank 3 which is usually atmospheric pressure. Consequently, since the pressure behind the lubricant has been reduced, the fitting valve 135 will close the opening to the fitting 26 and force any excess lubricant back into the coupling 25 and before the valve 105 of the coupling which will now also act as a pressure reducing element will have an opportunity to close, a certain amount of the lubricant therein will be forced back into the pump as a result of the lubricant pressure existing in the coupling.

During restoration of the member 105 to its normal position, it effectively enlarges the lubricant passage 96 to the extent and in the manner previously described, to thus reduce residual pressure in the coupling. Consequently, lubricant remaining in the passage 96 after relief valve 35 of the pump had been opened to relieve the pressure thereon, will be sucked away from the fitting attaching end of the coupling to preclude pressure ejection therefrom. As the pressure in the coupling drops still further to the point where the large spring 81 may again assume its initial position, the spring 81 will act to retract the sealing member 75 and gasket 114 back into the body member 57 away from the fitting 25.

When all the component parts of the coupling have been restored to their normal positions, the coupling will be in condition to be removed from engagement with the fitting, which removal is facilitated by the absence of any pressure engagement between the coupling and fitting. Subsequent connection of the coupling to the fitting is likewise made easy. Furthermore, the retraction of the sealing means away from the fitting engaging end of the coupling will assure that the sealing gasket 114 will not engage the fitting during connection of the coupling thereto or removal therefrom. Consequently, the gasket 114 will not be subjected to the abrasion which sealing gaskets of prior art devices are exposed to. The coupling, upon being disengaged from the fitting will be clean and free of excess lubricant.

No pressure ejection of lubricant can possibly occur during removal of the coupling, due to operation of the relief valve 35 and the pressure reducing function of element 105.

During lubrication, when employing a coupling as described, that portion of the sealing gasket 91 (Fig. 2) which bears against the inner wall of the body element 57 will be subjected, by reason of the passages 115, to the high lubrication pressures built up in the coupling. These pressures against the wall contacting portion of the gasket 114 will serve to effectively seal the coupling against any possibility of leakage of lubricant between the sealing means element 75 and the body element 57.

The modified coupling of Fig. 3 is essentially the same in principle as that of Fig. 2; the primary difference residing in the provision of means not dependent upon lubricant pressure for sealing against leakage of lubricant along the inside wall of the coupling body member 57. Therefore, such modification will only be described in the details wherein it differs from that of Fig. 2; the same reference characters being applied to the parts of Fig. 3 corresponding to the same parts in Fig. 2. The sealing means element 75 is constructed of two component parts 119 and 121, for a purpose to be subsequently related, adapted to be connected, with the part 119 threaded at one end into an end 130 of the other part 121, the part 119 having an enlarged rim 123 at its other end to provide a shoulder 125 spaced from the connected end 130 of the part 121. Between this shoulder 125 and the connected end 130 of the part 121 of the sealing means element 75 is positioned a sealing gasket 127 of leather or the like having a portion resting against the shoulder 125 and an upstanding wall portion bearing in sealing engagement against the inner wall surface of the body element 57, to preclude leakage of lubricant. This gasket 127 is maintained in compression against the shoulder 125 and the wall of the body element 57 not by lubricant pressure as is the case with respect to gasket 114 of Fig. 2, but by coil spring 129 interposed between gasket 127 and the end 130 of part 121 of the sealing means element 75. A washer 131 is placed between the spring 129 and the gasket 127.

The outer end surface of the sealing means element 121, that is the surface which approaches the face of the fitting 26, has a circular groove formed therein, into which is compressed a sealing gasket 133 of leather or the like, this gasket 133 being adapted to abut against the face of the fitting 26 and form a protective wall about the opening to the fitting upon operation of the coupling to preclude escape of lubricant during the lubrication period. The internal diameter of this sealing gasket 133 is substantially the same as the opening into the fitting 26 whereby little if any of the face surface of the fitting will be exposed to the lubricant. In Fig. 4 the sealing means is shown in engagement with a fitting 26, the sealing gasket 133 sealing the engagement with the fitting to preclude escape of the lubricant at the outlet end of the coupling. The fitting valve 135 is shown unseated. This relationship of parts exists during lubrication and is similar to the arrangement of parts occurring during the lubrication period in the described operation of the coupling of Fig. 1 and Fig. 2.

The fact that the sealing means element 75 of the construction of Fig. 3 is made of two parts 119 and 121 in threaded detachable engagement with each other enables ready assembly of the spring 129 and gasket 127 in place, and also facilitates replacement of sealing gasket part 119 with a new gasket 133 when desired. For this purpose, the lower end of passage 96 is formed non-circular to enable engagement with a tool for screwing or unscrewing part 119.

From the above description of my invention, it will be apparent that the described constructions will enable realization of the objects of my invention in providing a lubrication system wherein the coupling may be readily connected and disconnected from a fitting, and wherein both the fitting and the coupling will be left clean and free of overhanging or dripping grease or lubricant upon the removal of a coupling from the fitting following a greasing operation. At no time will the sealing gasket of the improved coupling be subjected to abrasion, due to the fact that it is in spaced relationship to a fitting during the application and removal of the coupling from the fitting. Consequently its period of usefulness as a seal will be considerably lengthened, as well as the life of the coupling of which it constitutes an element.

The above described invention is subject to modification without departing from the scope thereof and I accordingly do not desire to be limited in my protection to the specific details of construction described by me, except as may be necessitated by the prior art and the appended claims.

I, therefore, claim as my invention:

1. A lubricating coupling or the like, adapted for engagement with a fitting, comprising sealing means normally in a retracted position with respect to the fitting engaging end of said coupling, said sealing means being actuable from its retracted position into sealing engagement with the fitting in response to pressure of incoming lubricant or the like, and means for retracting said sealing means upon reduction in said pressure of incoming lubricant.

2. A lubricating coupling or the like, adapted for engagement with a fitting, comprising sealing means actuable from a retracted position into sealing engagement with the fitting in response to pressure of lubricant in said coupling, valve means also actuable in response to pressure of lubricant in said coupling allowing flow of lubricant through said coupling, and means assuring actuation of said sealing means at a lower lubricant pressure than said valve means.

3. A lubricating coupling or the like, adapted for engagement with a fitting, comprising movably mounted sealing means, and spring means cooperating with said sealing means for urging said sealing means normally in a retracted position with respect to the fitting engaging end of said coupling, said sealing means being actuable from its retracted position against the action of said spring means into sealing engagement with the fitting in response to pressure of incoming lubricant or the like, and said spring means constituting means for restoring said sealing means to its retracted position upon reduction in pressure of the incoming lubricant.

4. A lubricating coupling or the like, adapted for engagement with a fitting, comprising a body, sealing means including a hollow plunger having sealing material adjacent an end thereof, said sealing means being actuable from a retracted position in said body into sealing engagement with the fitting in response to pressure of lubricant, valve means in the hollow portion of said plunger and operable in response to pressure of said lubricant for allowing flow of lubricant through the plunger, and means for assuring actuation of said sealing means at a lower lubricant pressure than that necessary to operate said valve means.

5. A lubricating system comprising a coupling adapted for engagement with a fitting and including sealing means normally in a retracted position with respect to the fitting engaging end of said coupling, valve means in said coupling for normally closing a passage through said coupling to the flow of lubricant, and means responsive to the pressure of lubricant supplied to said coupling for sequentially forcing said sealing means from its retracted position into sealing engagement with the fitting and opening said valve means to permit flow of lubricant through said coupling.

6. A lubricating coupling or the like comprising sealing means responsive to lubricant pressure for effecting a sealing relationship with a fitting, said coupling having a passage for flow of lubricant therethrough to such fitting, means in said passage for reducing residual pressure in said coupling, and means for correlating operation of the sealing means and the residual pressure reducing means to cause said residual pressure reducing means to become effective prior to breaking of said sealing relationship.

7. A lubricating coupling adapted for engagement with a fitting and containing a passage for flow of lubricant to such fitting, residual pressure reducing means in said passage comprising a member movable to enlarge the effective volume of said lubricant flow passage upon termination of lubricant pressure thereto.

8. A lubricating coupling adapted for engagement with a fitting and containing a passage for flow of lubricant to such fitting, residual pressure reducing means in said passage comprising a plunger operable to enlarge the effective volume of said lubricant flow passage upon termination of lubricant pressure thereto, said residual pressure reducing means also serving as a valve to control flow of lubricant through said passage.

9. A lubricating coupling comprising a member having a passage for allowing flow of lubricant under pressure to a fitting, and means associated with said passage for controlling flow of lubricant therethrough during lubrication and reducing residual pressure upon termination of lubricant pressure.

10. A lubricating coupling or the like adapted for engagement with a fitting comprising a hollow body adapted for connection with said fitting, plunger mechanism slidably mounted within said body having an aperture for flow of lubricant into said fitting and sealing material about said aperture adapted to be maintained in sealing relationship with said fitting by pressure of lubricant acting against said plunger mechanism, spring means within said body urging said plunger mechanism in a direction to maintain said sealing material in a retracted position within said body free of engagement with said fitting upon connection of the coupling thereto, said spring means being yieldable against the action of lubricant pressure to allow said plunger mechanism to move said sealing material into sealing contact with said fitting by said pressure of lubricant, valve means within said coupling for controlling flow of lubricant through said aperture, and second resilient means within said coupling acting against said valve means to maintain it closed until the lubricant pressure in said coupling increases as a result of said sealing contact of said sealing material with said fitting but yieldable upon such increase of pressure to allow flow of lubricant through said aperture.

11. A lubricating coupling or the like adapted for engagement with a fitting comprising a hollow body adapted for connection with said fitting, plunger mechanism slidably mounted within said body having an aperture for flow of lubricant into said fitting and sealing material about said aperture adapted to be maintained in sealing relationship with said fitting by pressure of lubricant acting against said plunger mechanism, spring means within said body urging said plunger mechanism in a direction to maintain said sealing material in a retracted position within said body free of engagement with said fitting upon connection of the coupling thereto, said spring means being yieldable against the action of lubricant pressure to allow said plunger mechanism to move said sealing material into sealing contact with said fitting by said pressure of lubricant, valve means within said coupling for controlling flow of lubricant through said aperture, and second resilient means within said coupling acting against said valve means to maintain it closed until the lubricant pressure in said coupling increases as a result of said sealing contact of said sealing material with said fitting but yieldable upon such increase of pressure to allow flow of lubricant through said aperture, said valve means including a piston like portion for reducing residual pressure in said lubricant coupling upon termination of said lubricant pressure.

12. A lubricating coupling or the like adapted for engagement with a fitting comprising a body adapted for connection with said fitting and having a passage for allowing flow of lubricant, said passage having a cylinder wall portion, and a plunger member having a piston portion adapted to engage slidably said cylinder wall portion, but which under the influence of lubricant pressure is moved out of engagement with said cylinder wall portion to allow flow of lubricant therepast and upon termination of lubricant pressure is moved into engagement with said cylinder wall portion to enlarge the effective volume of said passage and thereby reduce residual pressure.

13. A lubricating coupling or the like adapted for engagement with a fitting comprising a body adapted for connection with said fitting and having a passage for allowing flow of lubricant, said passage having a cylinder wall portion, a plunger member having a piston portion adapted to engage slidably said cylinder wall portion, but which under the influence of lubricant pressure is moved out of engagement with said cylinder wall portion to allow flow of lubricant therepast and upon termination of lubricant pressure is moved into engagement with said cylinder wall portion to enlarge the effective volume of said passage and thereby reduce residual pressure, and resilient means cooperating with said plunger member to move said piston portion into engagement with said cylinder wall portion upon said termination of said lubricant pressure.

OSCAR L. STARR.

CERTIFICATE OF CORRECTION.

Patent No. 2,240,870.  May 6, 1941.

OSCAR L. STARR.

It is hereby certified that error appears in the printed specification of the above numbered patent requiring correction as follows: Page 1, second column, line 40, for the word "restricted" read --retracted--; and that the said Letters Patent should be read with this correction therein that the same may conform to the record of the case in the Patent Office.

Signed and sealed this 24th day of June, A. D. 1941.

(Seal)

Henry Van Arsdale,
Acting Commissioner of Patents.